March 9, 1954  C. E. BAXTER, JR  2,671,364
DEVICE FOR APPLYING ANTISKID CHAINS TO VEHICLE WHEELS
Filed April 8, 1952
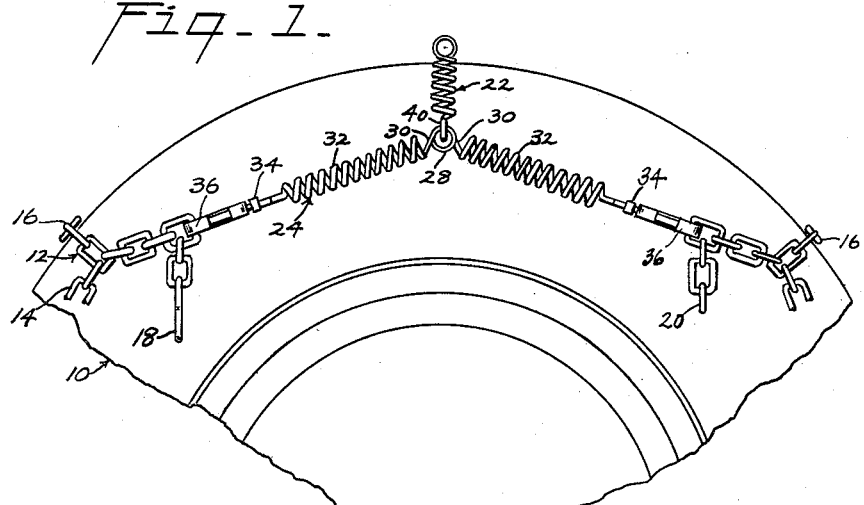
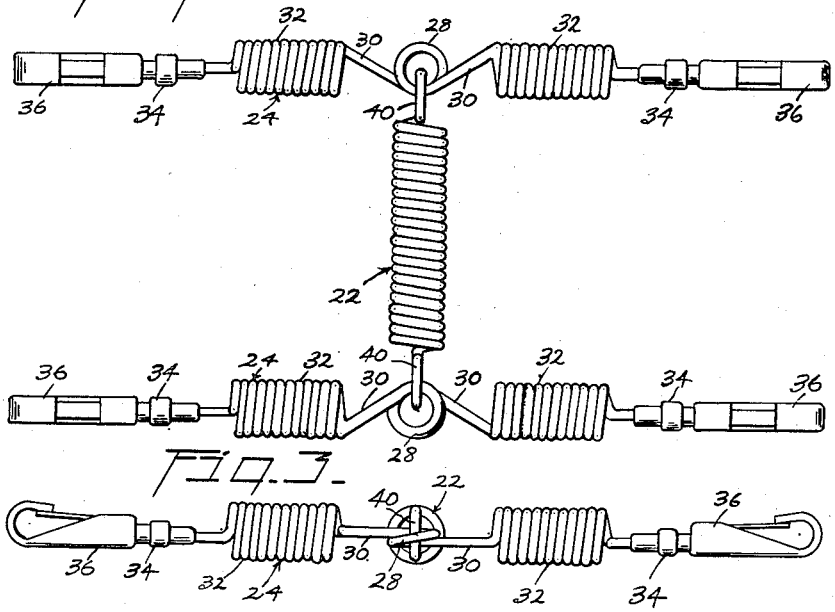
INVENTOR.
CHARLES E. BAXTER, JR.
BY
McMorrow, Berman & Davidson
ATTORNEYS Patented Mar. 9, 1954

2,671,364

UNITED STATES PATENT OFFICE 2,671,364

DEVICE FOR APPLYING ANTISKID CHAINS TO VEHICLE WHEELS

Charles E. Baxter, Jr., Wood-Ridge, N. J.

Application April 8, 1952, Serial No. 281,125

2 Claims. (Cl. 81—15.8)

1

This invention relates to a device the main purpose of which is to facilitate application of anti-skid chains to vehicle wheels.

One type of anti-skid chain in widespread use today comprises a pair of elongated chain members connected in parallel relation by a plurality of relatively short chain members, the last-named chain members being spaced longitudinaly of the elongated members. In the application of an anti-skid chain of this type to a vehicle wheel, the first step is to jack up the wheel to which the chain is to be applied, after which the chain is applied to the wheel, with the opposite ends of each of the elongated chain members being connected to form said elongated members into inner and outer chain rings respectively overlying the inner and outer side walls of the tire casing. When the chain rings are applied in this manner, the relatively short chain members extending transversely therebetween extend over the tread of the tire casing.

It is well appreciated among users of anti-skid chains of this type that it is rather difficult, in many instances, to apply the chain to the wheel, in view of the fact that the user must manually grasp the opposite ends of each of the elongated chain members, and draw said opposite ends toward one another to connect the same. This task is difficult by reason of the fact that the anti-skid chain, when positioned over the vehicle tire casing, must be tensioned about said casing by the exertion of physical effort on the part of the user, before the opposite ends of each ring are drawn sufficiently close together to permit them to be joined.

In view of the above, the main object of the present invention is to provide a device which can be attached to an anti-skid chain of the character referred to, in such a manner as to facilitate first, the application of the chain to the vehicle wheel, and second, the connection of the opposite ends of each chain ring, the device being readily removed after the anti-skid chain has been properly applied to the wheel.

Another important object is to provide a device as stated which can be both attached to and detached from an anti-skid chain of conventional design with considerable speed and facility.

Yet another object is to provide a device of the character described which will be of simple construction, so as to permit its manufacture at relatively low cost.

Another object is to provide a device for applying an anti-skid chain to a vehicle wheel which will be so formed as to be rugged, and capable of use over a long period of time.

Summarized briefly, the device constitutes an H-shaped assembly formed of a pair of normally parallel longitudinal members and a transverse member extending between and connecting the midlength portions of the longitudinal members. The longitudinal members are adapted, at their opposite ends, for detachable connection to the opposite ends of the chain rings of an anti-skid chain of the type referred to above, and are formed of coil spring material, so as to be permitted resilient expansion and contraction in the direction of their lengths. The transverse member is also formed of coil spring material, and constitutes a handle which can be grasped during the operation of applying the anti-skid chain. The longitudinal members, when applied to the chain rings of an anti-skid chain, permit the chain to be readily slipped over the tire casing of a vehicle wheel, said longitudinal members being thereafter manipulated in a manner to draw the opposite ends of each chain ring toward one another to facilitate connection of the opposite ends of each ring.

Other objects will appear from the following description, the claims appended thereto, and from the annexed drawing, in which like reference characters designate like parts throughout the several views, and wherein:

Figure 1 is a front elevational view in which a vehicle wheel and its associated anti-skid chain have been illustrated fragmentarily, the device constituting the present invention being shown in the position assumed thereby during the application of the anti-skid chain to the wheel;

Figure 2 is a top plan view of the device alone, on an enlarged scale; and

Figure 3 is a side elevational view of said device.

Referring to the drawings in detail, the reference numeral 10 has been generally applied to a vehicle wheel, to which an anti-skid chain 12 is to be applied.

The anti-skid chain 12 is of conventional design, and no claim is made herein to the illustrated construction thereof.

There has been illustrated, in Figure 1, an outer chain ring 14, constituting a component of the chain 12. It will be understood, in this connection, that the chain 12 also includes an inner chain ring, which is formed identically to the outer ring. A plurality of cross members 16 extend between and connect the inner and outer chain rings, at locations spaced circumferentially of the tire casing of the wheel 10.

Both the chain rings and the cross members are formed throughout of connected chain links, and before application of the anti-skid chain to the vehicle wheel 10, the chain rings, when laid flat upon the ground surface, appear as elongated chain members or elements, disposed in parallel relation and connected at locations spaced longitudinally thereof, by relatively short cross members 16.

At one end of each of the chain rings, an elongated connecting link 18 is conventionally employed, said link being extendable through a connecting link 20 on the other end of the same chain ring to close the ring and complete application thereof to the vehicle wheel.

The device constituting the present invention is used entirely for the purpose of facilitating application of the conventional anti-skid chain 12 to the vehicle wheel 10, and as will be noted from Figure 2, is formed as a generally H-shaped assembly that includes a single transverse member 22 and a pair of longitudinal members 24.

The longitudinal members 24 are of identical, though oppositely arranged, construction, and accordingly, one only need be described. As will be noted, each longitudinal member 24 includes an eye 28 disposed at its midlength location, said eye being formed (Figure 3) as a single spring coil the opposite ends of which merge into oppositely extended arms 30. The arms 30, in the normal position thereof, are disposed at an obtuse angle to one another (Figure 2), and merge at their outer ends into end portions 32, each end portion being formed of a series of normally closed, spring coil convolutions.

Mounted upon the outer ends of the end portions 32 of each longitudinal member 24 are swivels 34 carrying clasps 36. The clasps are thus swivelly mounted upon the opposite ends of each longitudinal member 24 for free rotatable movement of said clasps during the operation of applying the anti-skid chain to the vehicle wheel.

The transverse member 22 is also formed of a series of spring coil convolutions, having at its opposite ends eyes 40 loosely engaged with the eyes 28 of the longitudinal members.

In use of the device, the anti-skid chain 12, after the vehicle wheel 10 has been jacked up in the usual manner, is stretched out upon the ground surface adjacent the wheel so as to straighten out any kinked portions that may exist therein. Each longitudinal member 24 is then connected, at its opposite ends, to the opposite ends of one of the elongated chain members or rings of the anti-skid chain. The connection of the opposite ends of each longitudinal member 24 to its associated chain ring is accomplished by engaging the swivelled clasps 36 of said member 24 with selected links of the chain ring. The selected links, as may be noted from Figure 1, are disposed, preferably, two or three links away from the ends of the chain ring.

As a next step, the anti-skid chain application device is positioned at the top of the vehicle wheel, with the entire anti-skid chain 12 depending therefrom over the outer face of the vehicle wheel.

The anti-skid chain is then spread over the tire casing, starting from the top of the casing and working downwardly along the casing in opposite directions from the device constituting the present invention. This operation is carried out as closely as possible to the bottom of the vehicle wheel.

As a next step, the user presses downwardly on the lowermost portion of the inner chain ring, to force the same under the lowermost portion of the tire casing to the inner side wall of the tire casing. During this step of the operation, the longitudinal members 24 will be resiliently expanded in the direction of their lengths, as shown in Figure 1, with the end portions 32 of the respective longitudinal members being shifted, by reason of the spring coil 28 and the arms 30, into an angular relationship.

After the inner chain ring has been positioned against the inner side wall of the tire casing, the entire anti-skid chain will be in proper position upon the vehicle wheel. In this connection, as soon as the inner chain ring has been positioned in this manner, the entire anti-skid chain will develop considerable slack, even though the convolutions of the end portions 32 of the members 24 contract, this being due to the fact that even in the contracted relationship of said convolutions, the ends 18, 20 of the chain rings will be still spaced a substantial distance apart.

The user now grasps the transverse member 22, using said member as a handle, and pulls thereupon in the direction of his person. This causes the links 18, 20 of the inner chain ring to be drawn toward one another until they are spaced apart only a short distance, and can be readily joined.

Still grasping the transverse member 22, the user draws the opposite ends of the outer chain ring toward one another, to connect the end links 18, 20 thereof.

The anti-skid chain 12 will now be properly tensioned about the tire casing, with the application of said anti-skid chain being fully completed. The user then unsnaps the clasps 36 from their associated chain links, removing the device for applying the anti-skid chain.

It will be understood that although the operation has been described in considerable detail herein, in practice the application of the anti-skid chain 12 can be carried out easily and in minimum time. The chain application device, in this regard, is believed to have, as an important characteristic thereof, the feature of reducing considerably the physical effort required on the part of the user.

Another important characteristic of the invention is considered to reside in the fact that it can be manufactured at relatively low cost, in a relatively simple manufacturing operation. This is due to the fact that the longitudinal members 24 and transverse member 22 are formed, in each instance, of a single length of spring wire material, with said members being readily connected to one another to complete the formation of the device.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a device for applying to a vehicle wheel antiskid chains of the type including inner and outer chain rings locatable at opposite sides of a vehicle tire casing and connected by cross members extendable over the tread of the casing, a generally H-shaped assembly comprising a pair of longitudinal members each of which includes, at its opposite ends, swivelled clasps for detachable connection of said member to the opposite ends of one of said rings, said members being respectively formed of lengths of coil spring material and being resiliently expandable and contractable in the direction of their lengths, for applying said rings to a vehicle wheel and drawing the ends of each ring together to facilitate joining the same; and a transverse member extending between and connected at its opposite ends to intermediate portions of said longitudinal members to provide a handle capable of being grasped by a user for drawing the ends of each ring toward each other, said transverse member also being formed of a length of coil spring material and being adapted for resilient expansion and contraction in the direction of its length to cooperate with the longitudinal members in the application of said rings to the wheel and drawing the ends of the rings together.

2. In a device for applying to a vehicle wheel antiskid chains of the type including inner and outer chain rings locatable at opposite sides of a vehicle tire casing and connected by cross members extendable over the tread of the casing, a generally H-shaped assembly comprising a pair of longitudinal members each of which includes, at its opposite ends, swivelled clasps for detachable connection of said members to the opposite ends of one of said rings, each of said members being formed from a single length of spring wire material shaped to provide an eye at the midlength location of the member and to provide on said member end portions each of which has a series of coil spring convolutions, to allow for resilient expansion and contraction of each longitudinal member in the direction of its length in a manner effective to facilitate application of said chain rings to a vehicle wheel and drawing of the ends of each ring together; and a transverse member extending between said longitudinal members and having eyes at its opposite ends loosely engaging the eyes of the longitudinal members, to provide a handle capable of being grasped by a user for drawing the ends of each ring toward each other, said transverse member also being formed of a length of coil spring material and being adapted for resilient expansion and contraction in the direction of its length, to cooperate with the longitudinal members in the application of said rings to the wheel and the drawing of the ends of the rings together.

CHARLES E. BAXTER, Jr.

References Cited in the file of this patent

UNITED STATES PATENTS

| Number | Name | Date |
|---|---|---|
| 1,072,522 | Staples | Sept. 9, 1913 |
| 1,372,195 | Rounds | Mar. 22, 1921 |
| 1,456,412 | Watt | May 22, 1923 |
| 1,597,549 | Siegel | Aug. 24, 1926 |
| 2,063,358 | Winkley | Dec. 8, 1936 |
| 2,259,926 | Delvo | Oct. 21, 1941 |